United States Patent [19]

Stencel

[11] Patent Number: 5,017,069
[45] Date of Patent: May 21, 1991

[54] SLEEVE BOLT

[75] Inventor: Edgar L. Stencel, Alta Loma, Calif.

[73] Assignee: Northrop Corporation, Los Angeles, Calif.

[21] Appl. No.: 401,218

[22] Filed: Aug. 30, 1989

[51] Int. Cl.⁵ .................. F16B 23/00; F16B 35/06
[52] U.S. Cl. .................. 411/403; 411/407; 411/910
[58] Field of Search .......... 411/402, 403, 404, 407, 411/410, 910, 919; 81/436, 438; 403/19

[56] References Cited

U.S. PATENT DOCUMENTS

| | | | |
|---|---|---|---|
| 3,044,584 | 7/1962 | Thompson | 411/403 |
| 3,114,401 | 12/1963 | Johnson | 81/438 |
| 4,620,428 | 11/1986 | Kopesky | 411/910 |
| 4,822,227 | 4/1989 | Duran | 411/403 |

Primary Examiner—Neill R. Wilson
Attorney, Agent, or Firm—Terry J. Anderson; Robert B. Block; Karl J. Hoch, Jr.

[57] ABSTRACT

A sleeve bolt for coupling together workpieces including a cylindrical sleeve having a cylindrical outer surface and an axial bore with a radially interior surface of polygonal configuration at one end and internal threads at the other end. An inner slide member with a polygonally shaped cross-sectional configuration positioned within the bore at the polygonally configured end for movement between a retracted orientation totally within the cylindrical sleeve and a protruding orientation partially withdrawn from the cylindrical sleeve. A coupling connects the inner slide member for sliding movement along the longitudinal axis of the sleeve between the retracted and protruding orientation and includes stop means connected to the sleeve for defining the limits of movement of the slide member between retracted and protruding orientations.

9 Claims, 2 Drawing Sheets

SLEEVE BOLT

BACKGROUND OF THE INVENTION

1. Field of the Invention

This invention relates to an improved sleeve bolt and, more particularly, to a sleeve bolt having a cylindrical sleeve and an inner polygonal shaped slide member movable between a protruding orientation for coupling with a tool and a retractable orientation wherein its exterior surface is flush with the head of the sleeve bolt and external surface of the panel being coupled, the exposed longitudinal external surface of the inner slide member being essentially recess-free.

2. Description of the Background Art

In the aircraft field, external panels are normally joined with substructures through fasteners known as sleeve bolts. When installed, the external surface of a sleeve bolt must be as smooth, continuous and flush as possible with respect to the external surface of the panels. The external surface of a sleeve bolt must also be formed essentially recess-free for generating minimum air turbulence and resistance with respect to the aircraft utilizing such sleeve bolt. During installation and removal, the sleeve bolt must present a polygonally shaped component such as a hex shape, triangular, quadrilateral, pentagonal or octagonal for example, for positive engagement with a tool for the insertion and removal of the sleeve bolt.

Various approaches are disclosed in the prior art for the design of sleeve bolts. Such designs may take the form of one piece fasteners or multi-piece fastener assemblies. All such fasteners, however, recognize the need for providing a mechanism for coupling with a tool for insertion and removal of the fastener with respect to the panels being joined, and all such fasteners recognize the need for constructing the external surface of the fastener flush with the external surface of the panels with as smooth and continuous a surface as possible for abating wind turbulence which is otherwise normally generated during flight of the aircraft.

In addition, various approaches are disclosed in the patent literature for improving fasteners. Note, for example, Duran U.S. Pat. No. 4,822,227 which discloses a fastener with a bolt head having a hex socket with a releasable plug therein. The plunger portion is biased by a spring to keep it in a raised position. A working tool is used to press the plunger downward. DeLacy U.S. Pat. No. 3,078,574, discloses the concept of a bolt head having a recess which receives a separate drive socket insert therein. Stull, in U.S. Pat. No. 1,096,070 shows a common fastener having a protruding wrench engaging head.

As illustrated in other patents and commercial devices and techniques, efforts are continuously being made in an attempt to improve sleeve bolts for joining panels, as in aircraft. Such efforts are made to render such sleeve bolts more efficient, reliable, inexpensive and convenient to use. None of these previous efforts, however, provides the benefits attendant with the present invention. Additionally, the prior patents and commercial devices do not suggest the present inventive combination of component elements arranged and configured as disclosed and claimed herein. The present invention achieves its intended purposes, objects and advantages over the prior art through a new, useful and unobvious combination of component elements with the use of a minimum number of functioning parts, at a reasonable cost to manufacture, and by employing readily available material.

Therefore, it is an object of this invention to provide a stainless steel sleeve bolt for coupling together an apertured external panel and a substrate of an aircraft. The bolt comprises a cylindrical sleeve having a radially exterior surface of a cylindrical configuration at its axial external end and having internal threads at its axial internal end for threadingly coupling with a fixed substrate bolt. The bolt further comprises an inner polygonal shaped member which according to a preferred embodiment is illustrated as a hex shape having a hexagonal cross-sectional configuration positionable within the axially external end of the cylindrical sleeve and movable between a retracted orientation totally within the cylindrical sleeve and a protruding orientation partially within the cylindrical sleeve. The bolt comprises coupling means including a pair of grooves within the cylindrical sleeve extending longitudinally with the axis. A pair of ball detent members located within a diametrically extending hole of the inner hex slide cooperate with a coil spring urging the ball detents outwardly into the grooves. The longitudinal length of the grooves defines the limits of movement of the ball detent means and inner hex slide between its retracted and protruding orientations. The grooves include surface portions formed at obtuse angles from the axis of the sleeve bolt at opposite ends of the groove extremities. Other surface portions intersect and taper inwardly therefrom to a central point along the groove forming acute angles from the axis at the midpoint of the groove.

It is further a object of this invention to join panels, such as those relating to an aircraft, through a sleeve bolt which, when installed, presents an essentially smooth, continuous and essentially recess-free surface with the panels.

It is a further object of this invention to join a panel to a substructure with a sleeve bolt which presents an enlarged component for coupling with an insertion/removal tool for maximum surface area therebetween.

It is a further object of the present invention to slide an inner polygonal shaped member of a sleeve bolt between a protruding orientation for coupling with an insertion/removing tool and a retracted orientation wherein a smooth, continuous and essentially recess-free surface of the joined panels is presented.

Lastly, it is an object of the present invention to join panels more efficiently, reliably, conveniently and economically.

These purposes, objects and advantages should be construed as merely illustrative of some of the more prominent features and applications of the present invention. Many other beneficial results can be obtained by applying the disclosed invention in a different manner or by modifying the invention within the scope of the disclosure. Accordingly, other purposes, objects and advantages as well as a full understanding of the invention may be had by referring to the summary herein mentioned and detailed description describing the preferred embodiments of the invention, in addition to the scope of the invention, as defined by the claims, taken in conjunction with the accompanying drawings.

SUMMARY OF THE INVENTION

The present invention is defined by the appended claims with a specific embodiment thereof shown in the attached drawings. For the purposes of summarizing the invention, the invention may be incorporated into a sleeve bolt for coupling together a pair of apertured panels or an apertured external panel with an underlying substrate in an aircraft. The sleeve bolt comprises a cylindrical sleeve having a radially exterior surface of a cylindrical configuration and having a radially interior surface of a polygonal configuration at its axial external end. Internal threads at its axial internal end are employed for threadingly coupling with a fixed substrate bolt or with a bolt engaging a second underlying panel. An inner slide member having a polygonally shaped cross-sectional configuration conformably mates with the interior polygonal configuration to form a slide positionable from the axially external end of the cylindrical sleeve between a retracted orientation totally within the cylindrical sleeve to a protruding orientation partially within the cylindrical sleeve. Means for coupling the inner slide member within the cylindrical sleeve are provided which define limits of sliding movement between the retracted and protruding orientations.

The coupling means includes groove means within the cylindrical sleeve extending generally longitudinally with the sleeve axis. Ball detent means located within a diametrically extending hole means of the inner slide cooperate with resilient means urging the ball detent means outwardly into the groove means. The longitudinal length of the groove means along the sleeve axis defines the limits of movement of the ball detent means and inner slide member between its retracted and protruding orientations. The ball detent means includes a pair of ball members extending oppositely outwardly from opposing surfaces adjacent to the peripheral surface of the inner slide member with the resilient means being a coil spring therebetween. The groove means includes a pair of radially spaced grooves, each for receiving one of the ball detents. The grooves are formed in the cylindrical sleeve with surface portions at obtuse angles from the longitudinal axis of the sleeve bolt at opposite ends of the grooves extremities. Other surface portions intersect and taper inwardly therefrom to a central point along the grooves forming acute angles from the axis at the midpoint of the grooves. The obtuse angles are such that the ball detents do not pass beyond the limit points as defined by the intersection of the obtuse and acute angles in the grooves in either direction and will remain therebetween during operation and use. The acute angles are such that the ball detents will pass to either side of the midpoint of the grooves to create locking zones for the ball detents at the limit points for defining both the protruding orientation and the retracted orientation.

The foregoing has outlined rather broadly the more pertinent and important features of the present invention in order that the detailed description of the invention that follows may be better understood so that the contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other fasteners for carrying out the same purposes and objectives of the present invention. It should also be realized by those skilled in the art that such equivalent fasteners do not depart from the spirit and scope of the invention as set forth in the appended claims.

BRIEF DESCRIPTION OF THE DRAWINGS

For a more complete understanding of the nature and objects of the invention, reference should be had to the following detailed description taken in conjunction with the accompanying drawings in which.

Similar reference numerals refer to similar parts throughout the several Figures.

DETAILED DESCRIPTION OF THE INVENTION

Figure 1:
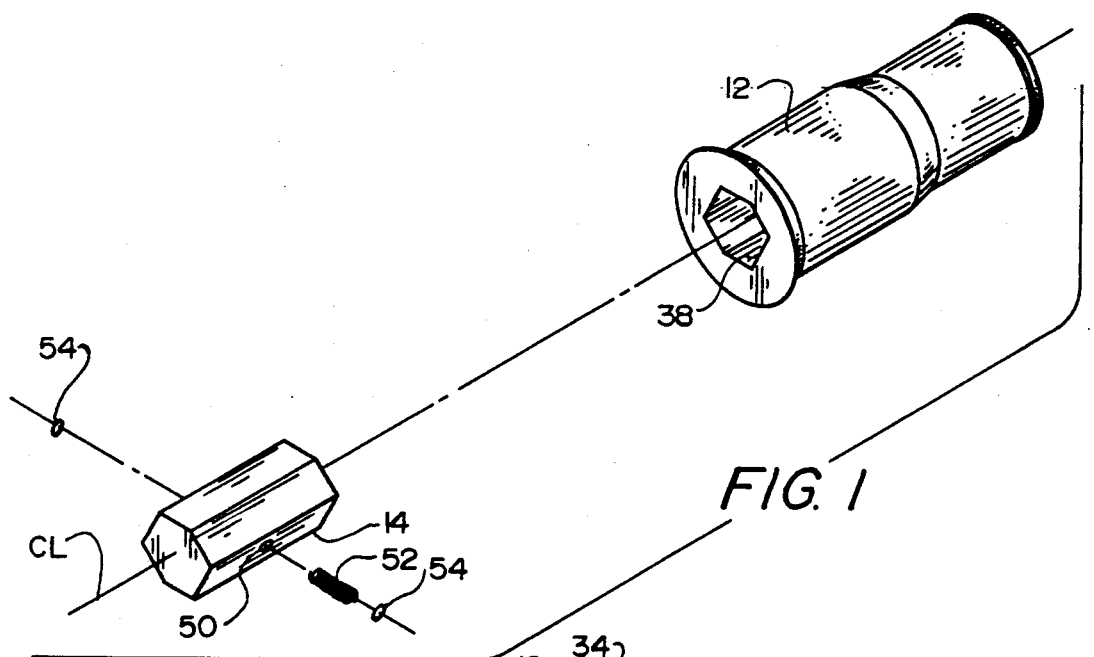
FIG. 1 is an exploded perspective view of a sleeve bolt constructed in accordance with the principles of the present invention.

With particular reference to the Figures, there is shown in FIG. 1 a sleeve bolt 10 constructed in accordance with the principles of the present invention. The sleeve bolt 10 is fabricated of two major components, a one-piece, hollow, cylindrical sleeve 12 and a multi-piece inner slide member 14. The sleeve 12 and slide member 14, are essentially symmetric about a common longitudinal axis or center line CL, and are couplable together to form the sleeve bolt 10 for joining an aperture panel to a substructure, as of an aircraft. Greater details of the sleeve bolt 10 can be seen by reference to the subsequent Figures.

Figure 2:
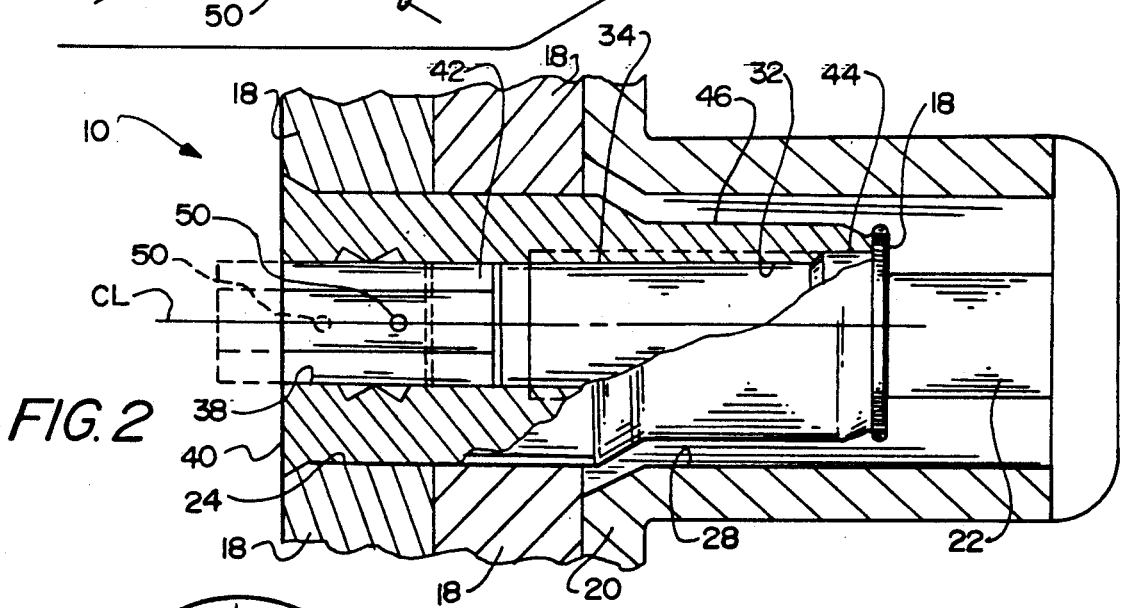
FIG. 2 is a plan view, partially in section, of the sleeve bolt shown in FIG. 1 illustrating its relationship with the panel being coupled with a substructure.
Figure 3:
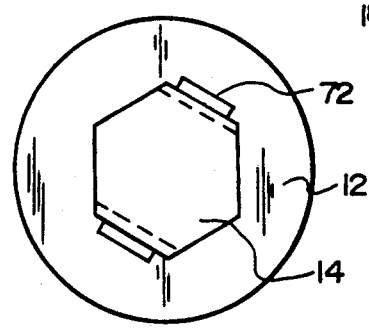
FIG. 3 is a side elevational view of the sleeve bolt of FIG. 2.
Figure 4:
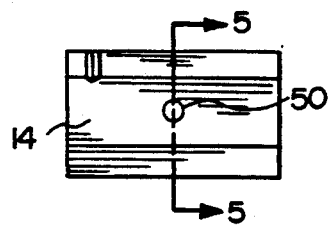
FIG. 4 is a plan view of the inner slide member shown in the prior Figures.
Figure 5:
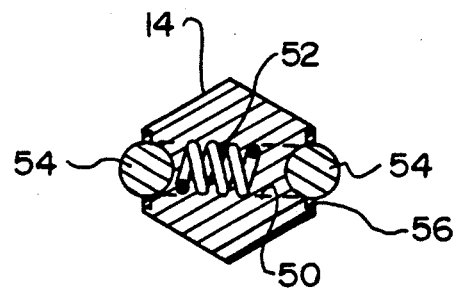
FIG. 5 is a sectional view of the inner slide member taken along line 5—5 of FIG. 4.

The FIG. 2 showing is a plan view, partly in section, of the sleeve bolt 10 with parts broken away to show certain internal construction. The interior slide member 14 is shown in its protruding orientation in dotted lines and in its retracted position in solid lines. The interior slide member 14 is readily positioned between such orientations by an installer or mechanic. The FIG. 2 illustration is schematic in that hole 50 is shown rotated 90 degrees about the center line CL simply for the purpose of clarity.

The FIG. 2 illustration also shows the external panel 18 to which the sleeve bolt 10 is coupled as well as the substructure 20 and substrate bolt 22 to which the sleeve bolt 20 is threadingly coupled. Each external panel 18 has a hole 24 extending therethrough with a countersunk exterior edge for receiving flared edges of the sleeve bolt 10. The substructure 20 is drilled with a hole 28 as an extension of the hole 24 of the external panel 18 and has a dished out section with a substrate bolt 22 extending therefrom in the direction of the sleeve bolt 10. The insertion of the sleeve bolt 10 into the holes 24 and 28, coupled with its rotation, will threadingly join internal threads 32 at the axially internal end 34 of the sleeve bolt with the threads of the substructure bolt 32.

The larger component of the sleeve bolt 10 is the cylindrical sleeve 12. The cylindrical sleeve has a hole 38 extending completely therethrough. Adjacent to the axially external end 40, the hole 38 is of a predetermined polygonal shape 42 sized to receive the inner slide 24 conformably mating in sliding relationship. According to the preferred embodiment a hexagonal shape has been selected and designed for the internal slide member 14 and mating portion 38 of sleeve bolt 10. It is to be understood however that other polygonal shapes of slide members can be employed within the spirit and scope of this invention, for example, triangular, quadrilateral, pentagonal, octagonal, etc. At the axially internal end 34 the cylindrical sleeve 12 is circular in cross-section with internal threads 32 for receiving the external threads of the substructure bolt 22. The axially internal end of the cylindrical sleeve 12 for a short distance is enlarged for facilitating the receipt of the free end of the substructure bolt 22, which is tapered. At a central section of its radially exterior surface, the cylindrical sleeve tapers to a reduced section 46 for self-aligning capabilities within the holes 24 and 28.

The threads of the substructure bolt 22 and cylindrical sleeve 12 according to one embodiment of the invention are of a coarse construction so that the fastener 10 may be removed from the bolt 22 and substructure 20 upon minimum rotation of the bolt 10. This allows for rapid removal of the bolt. This feature, in combination with the reciprocable inner slide member 14, permits quick release of the panels 18 for repair or replacement purposes.

Located within the external end of the cylindrical sleeve 12 is the inner slide member 14. The inner slide member 14 is essentially solid and according to one preferred embodiment of the invention is of a hexagonal cross-section along its entire length. It is of a size for being received totally within the conformably mating hexagonally shaped interior surface 42 of the cylindrical sleeve.

A radial hole 50 is drilled transverse to the longitudinal axis of the slide through the inner hex shaped slide member 14 for the receipt of a coil spring 52 and a pair of coupling ball detents 54 for retaining the inner slide 14 within the cylindrical sleeve 12 and for allowing movement of the inner slide member 14 between its protruding and retracted positions. Note FIG. 2. Further details of the spring and ball detents of the interior hex as well as its coupling grooves in the cylindrical sleeve can best be seen by reference to FIG. 6.

Figure 6:
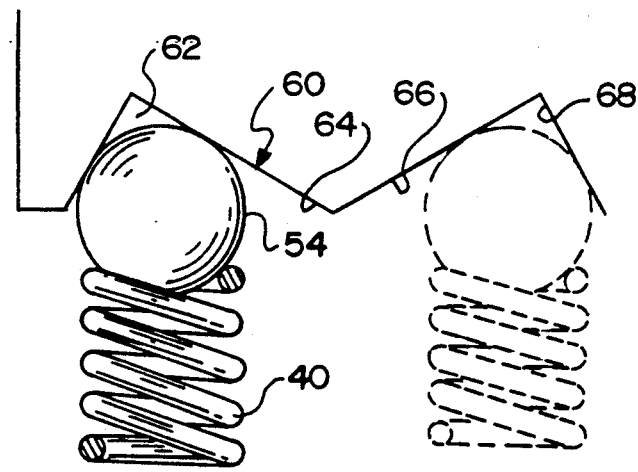
FIG. 6 is an enlarged sectional view of the groove and ball detent arrangement of the sleeve bolt shown in the prior Figures.
Figure 7:
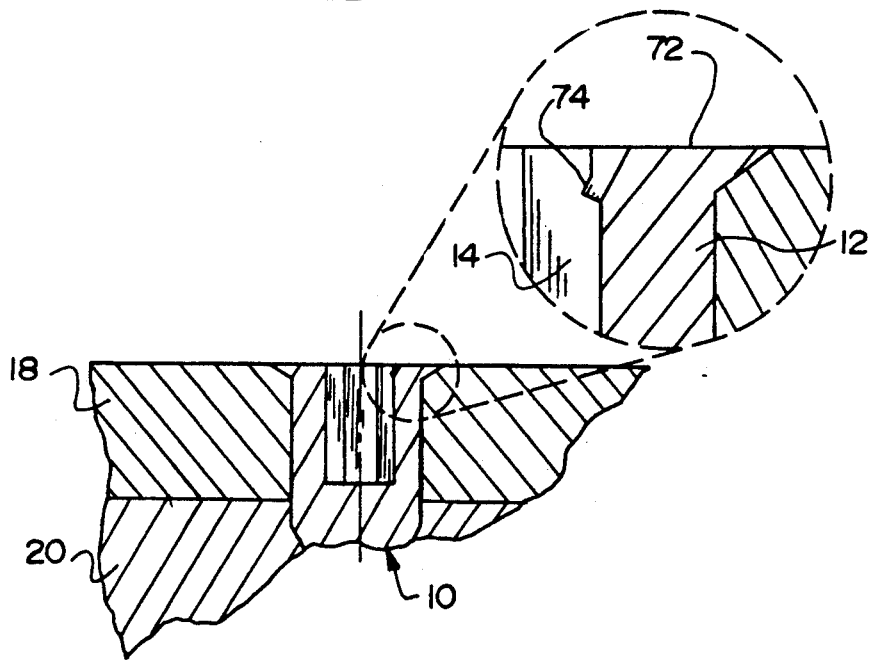
FIG. 7 is an enlarged sectional view of the interface between the cylindrical sleeve and inner slide member illustrating the lift slot in the retracted position.

In FIG. 6, the coil spring 52 can be seen located within the diametrically extending hole 50 of the interior slide member 14. Also located within the hole 50 of the inner slide 14 on opposite sides of the spring are detenting ball members 54. The ball members 54 are of a diameter to be positioned within the hole 50 adjacent its ends. Washers 56 are then swaged into the ends of the holes 50 to hold the ball members 54 in position with a minority of the surface extent of the ball members extending outwardly of the washers 56 and ends of the holes 50. The exposed portions of the ball detents extending through the washers 56 are located within grooves 60 on the interior surface of the cylindrical sleeve adjacent axially external end 40.

The grooves 60 extend axially inwardly of the external end surface of the cylindrical sleeve 12 and include surfaces 62 having an obtuse angle with the longitudinal axis of the sleeve bolt. The grooves also include surfaces 64 which have an acute angle with the longitudinal axis of the slide bolt. The grooves include mirror image portions to surfaces 62, 64 with surfaces 66 having acute angles with the longitudinal axis of the sleeve bolt and surfaces 68 having an obtuse angle with the longitudinal axis of the slide bolt. The two interior surface lines 64 and 66 of the grooves 60 are at acute or shallow angles allowing the movement of the ball therealong in either direction. The surface lines 62 and 68 form obtuse angles at the ends of the grooves 60 and are sufficiently obtuse so as to preclude the movement of the ball detent therepast in either direction. In this manner, the ball detents 54 are constrained for movement along the sleeve bolt axis within the groove but not beyond in either direction. In this manner, once the ball detents 54 are retracted by an operator and the internal slide member 14 inserted into the cylindrical sleeve 12, it will remain there during operation and use no matter how many times the inner slide is withdrawn for coupling with a tool or retracted to the non tool engaging position where a smooth, continuous and recess-free surface of the panel is presented.

The obtuse angles of the grooves are such that the ball detents will not pass beyond the grooves in either axial direction and will remain within the limits of the slide as defined by the length of the grooves during operation and use. Thus, the inner slide cannot be inadvertently removed or inserted farther than flush with the external panel. The acute angles of the grooves are such that the ball detents will pass to either side of the midpoint of the groove. Consequently, the locations of the ball detents as shown in FIG. 6 on each side of the groove midpoint will create locking zones for the ball detents. The locking zones are of an appropriate dimension to define both the retracted orientation for operation and use as well as the protruding orientation for fastener insertion and removal.

In order to effect a smooth movement of the internal slide 24 between its retracted and protruding orientation, lift slots 72 and 74 are provided in the axial exterior surface of the cylindrical sleeve and inner slide. The slots extend at an angle inwardly toward the axis of the sleeve bolt 10. Two such lift slots 72 are provided in the cylindrical sleeve with two corresponding lift slots 74 in the inner slide for the receipt of a slide engaging and positioning tool. A special tool is contemplated for concurrent insertion into the lift slots 72 and 74 and for grasping and lifting the inner hex from its retracted to protruding orientation. The lift slots provide as small as possible discontinuance of the exterior surface of the sleeve bolt. This, in combination with the flushness of the inner slide with respect to the external surface of the panels, abates the generation of air turbulence when an aircraft employing such sleeve bolt is in flight. Such abatement of air turbulence provides benefits such as improved fuel economy, greater flight control, reduced noise and vibrations, etc.

In the preferred embodiment, the external panel is normally fabricated of a strong, light-weight material such as titanium while the substructure is fabricated of a less expensive light-weight material, such as aluminum. Such materials are conventional in the aircraft industry. The external panel being coupled to the substrate might be a door, frame member, or the like. In addition, the sleeve bolt is preferably fabricated of stainless steel.

It should be understood, however, that the sleeve bolt herein is described as having particular utility in the aircraft industry. Such sleeve bolt, however, has a wide variety of uses in a wide variety of fields. Not only is it useful when fabricating a panel for coupling metal parts, it is readily adapted for being fabricated of advanced composite materials and for coupling together panels and substructures of advanced composite materials.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details may be resorted to without departing form the spirit and scope of the invention.

Now that the invention has been described,
What is claimed is:

1. A sleeve bolt for passing through an aperture in a panel to form a flush head fastener therefor and adapted to be screwed with a driver to be a complementary threaded fastener affixed to a substructure and extending therefrom through said aperture, comprising
 a hollow sleeve having a circularly cylindrical exterior and terminating in a head at one end,
 means forming internal threads in said sleeve at the other end thereof to couple to said threaded fastener,
 means forming a drive recess extending inwardly from the head end of said sleeve, said recess having a polygonal shape in radial cross section,
 a drive plug having a complementary polygonal shape to said recess in radial cross section and of a size for sliding movement within said drive recess,
 said drive plug and drive recess being shaped so that when the plug is fully inserted in the end of the sleeve it forms a smooth continuous surface with the head,
 means interiorly coupling the plug to the sleeve and for defining and limiting movement of the plug between two stable positions, the first an inserted position fully home within the sleeve with the head and the end of the plug forming said smooth continuous surface, and the second, a partially withdrawn position with the plug extended from the head for being turned by a driver,
 said coupling means requiring effort to move said plug between said stable positions, and
 means forming a lifting point accessible from the head end of said bolt for a tool to move the plug from an inserted position to said partially withdrawn position.

2. A sleeve bolt for coupling together a pair of apertured panels comprising:
 a cylindrical sleeve having a radially exterior surface of a cylindrical configuration and having a radially interior surface of a polygonal configuration at its axial external end and having internal threads at its axial internal end;
 an inner slide member having a polygonally shaped cross-sectional configuration positionable within the axially external end of the cylindrical sleeve and movable between a retracted orientation totally within the cylindrical sleeve and a protruding orientation partially within the cylindrical sleeve;
 means coupling the inner slide member within the cylindrical sleeve for sliding movement along the longitudinal axis of the sleeve between the retracted and protruding orientations,
 said coupling means including groove means within the cylindrical sleeve extending longitudinally with the cylindrical sleeve extending longitudinally with the longitudinal axis of the sleeve and ball detent means located within a diametrically extending hole mans of the slide member and with resilient means urging the ball detent means outwardly into the groove means, the longitudinal length of the groove means defining the limits of movement of the ball detent means and the inner slide member between its retracted and protruding orientations.

3. The sleeve bolt as set forth in claim 2 wherein the ball detent means includes a pair of ball members extending oppositely outwardly from opposing surfaces adjacent to the peripheral surface of the inner slide member with the resilient means being a coil spring therebetween.

4. The sleeve bolt as set forth in claim 3 wherein the groove means includes a pair of radially spaced grooves, each for receiving one of the balls.

5. The sleeve bolt as set forth in claim 4 wherein the grooves are formed in the cylindrical sleeve at obtuse angles from the longitudinal axis of the sleeve bolt at opposite ends and is formed to taper inwardly to a central point forming acute angles from the axis at the midpoint of the groove.

6. The sleeve bolt as set forth in claim 5 wherein the obtuse angles are such that the ball detents will not pass beyond the limit points as defined by the intersection of the obtuse and acute angles in the groove in either direction and will remain therebetween during operation and use, the acute angles being such that the ball detents will pass to either side of the midpoint of the grooves to create locking zones for the ball detents at the limit points for defining both the protruding orientation and the retracted orientation.

7. For use in an aircraft, a stainless steel sleeve bolt for coupling together an apertured external panel and substrate comprising:
 a cylindrical sleeve having a radially exterior surface of a cylindrical configuration and having a radially interior surface of a hexagonal configuration at its axial external end and having internal threads at its axial internal end for threadingly coupling with a fixed substrate bolt;
 an inner slide member having a generally hexagonal cross-section configuration positionable within the axially external hexagonally shaped end of the cylindrical sleeve and movable between a retracted orientation totally within the cylindrical sleeve and a protruding orientation partially within the cylindrical sleeve; and
 coupling means including a pair of grooves within the cylindrical sleeve extending longitudinal with the sleeve axis and a pair of ball detents located within a diametrically extending hole in the inner hex slide member with a coil spring urging the ball detents outwardly into the grooves, the longitudinal length of the grooves along the sleeve axis defining the limits of movement of the ball detent means and inner hex slide member between its retracted and protruding orientations, the grooves being formed in the cylindrical sleeve at obtuse angles from the longitudinal axis of the sleeve bolt at opposite ends and being formed to taper inwardly to a central point forming acute angles from the axis at the midpoint of the groove.

8. For use in an aircraft, a sleeve bolt for coupling together an apertured external panel and a substrate comprising:

a cylindrical sleeve having a radially exterior surface of a cylindrical configuration and having a radially interior surface of a polygonal configuration at its axial external end and having internal threads at its axial internal end for threadingly coupling with a substrate bolt;

an inner slide member having a polygonally shaped cross-sectional configuration conformably mating with the interior polygonal configuration to form a slide positionable within the axially external polygonally shaped end of the cylindrical sleeve and movable between a retracted orientation within the cylindrical sleeve to a protruding orientation partially within the cylindrical sleeve; and coupling means including a pair of grooves within the cylindrical sleeve extending generally longitudinally with the sleeve axis and a pair of ball detents located within a diametrically extending hole in the inner slide member with a coil spring urging the ball detents outwardly into the grooves, the longitudinal length of the grooves along the sleeve axis defining the limits of movement of the ball detent means and inner hex slide member between its retracted and protruding orientations, the grooves being formed in the cylindrical sleeve with surface portions at obtuse angles from the longitudinal axis of the sleeve bolt at opposite ends of the groove extremities, with other surface portions intersecting and tapering inwardly therefrom to a central point along the grooves forming acute angles from the axis at the midpoint of the grooves.

9. A sleeve bolt for coupling together a pair of apertured panels comprising:

a cylindrical sleeve having a radially exterior surface of a cylindrical configuration and having a radially interior surface of a polygonal configuration at its axial external end and having internal threads at its axial internal end;

an inner slide member having a polygonally shaped cross-sectional configuration positionable within the axially external end of the cylindrical sleeve and movable between a retracted orientation totally within the cylindrical sleeve and a protruding orientation partially within the cylindrical sleeve;

coupling means for connecting the inner slide member within the cylindrical sleeve for sliding movement along the longitudinal axis of the sleeve between the retracted and protruding orientations, said coupling means including groove means extending longitudinally of the longitudinal axis of one of the sleeve or side member and stop means located within the other of the slide member or sleeve for urging the stop means into the groove means, the longitudinal length of the groove means defining the limits of movement of the slide member between retracted and protruding orientations.

* * * * *